Sept. 13, 1966

C. E. MIKS ET AL 3,272,014

DEADWEIGHT GAUGE

Filed April 30, 1963

CLAUDE E. MIKS
LLOYD H. LINTON
GILBERT WILSON
INVENTORS

BY J. Vincent Martin,
Joe E. Edwards,
M. H. Gay
ATTORNEYS

Sept. 13, 1966  C. E. MIKS ET AL  3,272,014
DEADWEIGHT GAUGE
Filed April 30, 1963  3 Sheets-Sheet 3

CLAUDE E. MIKS
LLOYD H. LINTON
GILBERT WILSON
INVENTORS

BY J. Vincent Martin,
Joe E. Edwards,
M. H. Gay
ATTORNEYS

United States Patent Office 3,272,014
Patented Sept. 13, 1966

3,272,014
DEADWEIGHT GAUGE
Claude E. Miks, Lloyd H. Linton, and Gilbert Wilson, Houston, Tex., assignors to Ruska Instrument Corporation, Houston, Tex., a corporation of Texas
Filed Apr. 30, 1963, Ser. No. 276,733
5 Claims. (Cl. 73—419)

This invention relates generally to a pressure balance and more particularly to a pressure balance of the deadweight gauge type which has a full pressure range measuring capability.

The advance of technology has brought about a continually increasing requirement for extreme accuracy and close tolerance in present day manufacturing and research methods. This is particularly true in the measuring art where instruments having an extremely high degree of accuracy are commonly incorporated in production and research facilities. Use of these highly accurate instruments in production facilities, in turn, imposes a requirement for even more accurate instruments to calibrate and check production instruments.

In the art of pressure measurement, it is generally recognized that the highest levels of accuracy demand a simple, basic measuring instrument since the more complicated devices are subject to diverse sources of error which cannot be fully determined or compensated for. Two of the more commonly used high accuracy pressure measurement devices are the mercury column and the pressure balance or deadweight gauge.

The mercury column is, of course, desirable for use in many situations not only because of its inherent accuracy, but also because of its relative low cost and simplicity. In cases where high accuracy measurement of high pressures is required, however, the use of the mercury column becomes less feasible since the length of a column needed makes its use impractical. For example, measurement of pressures on the order of 30,000 p.s.i. requires a mercury column approximately one mile high.

In accurate high pressure measurement, it has therefore been necessary to utilize devices other than the mercury column. The pressure balance or deadweight gauge is an extremely accurate and relatively simple device for obtaining pressure measurements in the high pressure region. In its simplest form, this device consists of a piston movable in a vertical cylinder and floatable on the pressure medium to which it is to be measured. Weights of known mass are mounted on the piston until it is balanced and floating on the fluid medium. The total value of the weights required to bring about the balance condition of the piston and the area of the piston determine the pressure of the medium being measured. Means are generally provided to rotate the piston with respect to the cylinder walls to reduce sliding friction and eliminate system errors caused by this source.

The pressure balance is, at present, in use in industry especially in high pressure instrument calibration applications. The device is, in its present form, however, subject to some important limitations. One of these limitations is caused by the fact that the minimum pressure measurable in a pressure balance corresponds to the tare-weight of the system or the total mass of the piston and attached structure since the weight of the piston, of course, cannot be eliminated at present from the device.

Present art dead-weight gauges also encounter a problem in the system used to provide relative rotation between the piston and cylinder of the device. The gauges in use today provide relative rotation of the piston with respect to the cylinder. The gauge weights are always mounted on the rotating member. This imposes centrifugal forces on the weights which, in turn, imposes an additional requirement for extremely accurate centering of the weights on the piston axis. Such placement is difficult to achieve and if it is not accomplished, side forces are introduced in the system with the attendant errors imposed thereby. The rotating condition of the weights also complicates the problem of weight changing, and unless some complicated mechanism is provided, the tester must generally be stopped to allow addition or removal of the weights.

Another continuing problem inherent in the device involves the materials used in the piston-cylinder combination. Although some leakage of the fluid being measured between the piston and cylinder walls is necessary, this leakage must be kept to a minimum especially in the higher pressure regions. This imposes a requirement of a very close fit between the piston and cylinder wall to achieve a high degree of sealing with a minimum of friction. This close fit is best obtained by hand lapping the piston and cylinder. The constant rotation of the parts with respect to one another imposes an additional requirement of a highly wear-resistant piston and cylinder material, free of residual contaminates from fabrication thereof and capable of achieving and maintaining a highly smooth surface finish. These properties are required to retain original dimensions of the components in use and to maintain the friction between the components at a minimum.

Still another problem which has been encountered in the deadweight type gauge arises from the fact that the weights of the device must be placed on the tester by hand. In accomplishing testing of pressure values with a deadweight gauge, it is common to provide at least two reference sources of pressure with which to compare the measured values. These reference pressures are generally atmospheric and zero pressure, since pressures compared to atmospheric pressures are gauge pressures (p.s.i.g.) and pressures compared to zero pressure are absolute pressures (p.s.i.a.). In the situation where zero pressure is used as reference, the non-pressurized side of the piston of the system must be exposed to zero pressure. This is generally accomplished by placing a bell jar or the like over the piston and weight support structure and pulling a vacuum in the jar until zero pressure is approached. When the tester is operating under these conditions, the problem of replacing or altering the weight on the piston by hand is aggravated since the bell jar must be removed for each alteration of the weight and vacuum must again be pulled in the jar after the alteration is made. This is expensive and cumbersome since a great deal of time is generally required to pump the vacuum required and to produce an equilibrium at that pressure.

It is therefore an object of this invention to provide a pressure balance in which a full range of pressures can be measured.

It is a further object of this invention to provide an improved and accurate pressure balance which is adapted for use as a vertical deadweight gauge for measurement of a higher range of pressure and which, without change, can be utilized as a tilting gauge to measure a lower range of pressures.

It is another object of this invention to provide a pressure balance which is extremely durable and retains a high degree of accuracy over a long period of use.

It is yet another object of this invention to provide a pressure balance in which rotation is provided between the piston and cylinder structure thereof while the weights of the balance are rotationally stationary.

It is still another object of this invention to provide a pressure balance in which provision is made to rotate the cylinder with respect to its position.

It is yet another object of this invention to provide a material for use in a pressure balance which provides high wear-resistance and low-contaminate deposit resulting in high accuracy of the gauge over a long period of time.

It is still a further object of this invention to provide a deadweight tester in which the weights thereof are remotely adjustable so that adjustments may be made thereto without disturbing the ambient environment of the weights.

These and other objects of this invention will be more apparent to those skilled in the art by review of the following detailed description.

This invention provides, in essence, a pressure balance or deadweight gauge of an improved type which comprises a floating piston mounted on a pivotal axis to provide tilting of the longitudinal axis of the piston between a vertical and a horizontal position. While the piston is in the vertical position, provision is made to mount weights thereon to provide for accurate measurement of the higher pressure. With removal of the weights and supports therefor, the piston may then be tilted, and with the aid of proper angle measuring devices, pressures equivalent to weights lower than the mass thereof may be measured. This is achieved by tilting the piston until a floating balance is achieved and then measuring the angle at which this balance occurs. From this information, the component of gravitational force acting along the longitudinal axis of the piston is calculated and the pressure of the fluid being measured thereby determined in the usual manner.

This invention also incorporates tungsten carbide material for use in the piston-cylinder structure thereby solving many of the problems encountered in the prior art pressure-balance type gauges. By the use of tungsten carbide as the cylinder liner and piston material, it has been found that the high degree of wear resistance of this material in combination with the property of low contamination deposit from wear and other sources provides extremely beneficial results in that the critical dimensions of these components are maintained over a longer period of time and deposition of contaminates is kept at a minimum. This prevents increase of friction which decreases the accuracy of the device.

The invention further provides a system for remotely handling and adjusting the weights on the piston of the tester so that adjustments in weights may be made through a vacuum bell jar or other similar structure without disturbing the environment therein.

The invention will be better understood by reference to the following detailed description when read in conjunction with the accompanying drawings in which like numerals indicate like components thereof and wherein.

Figure 1:
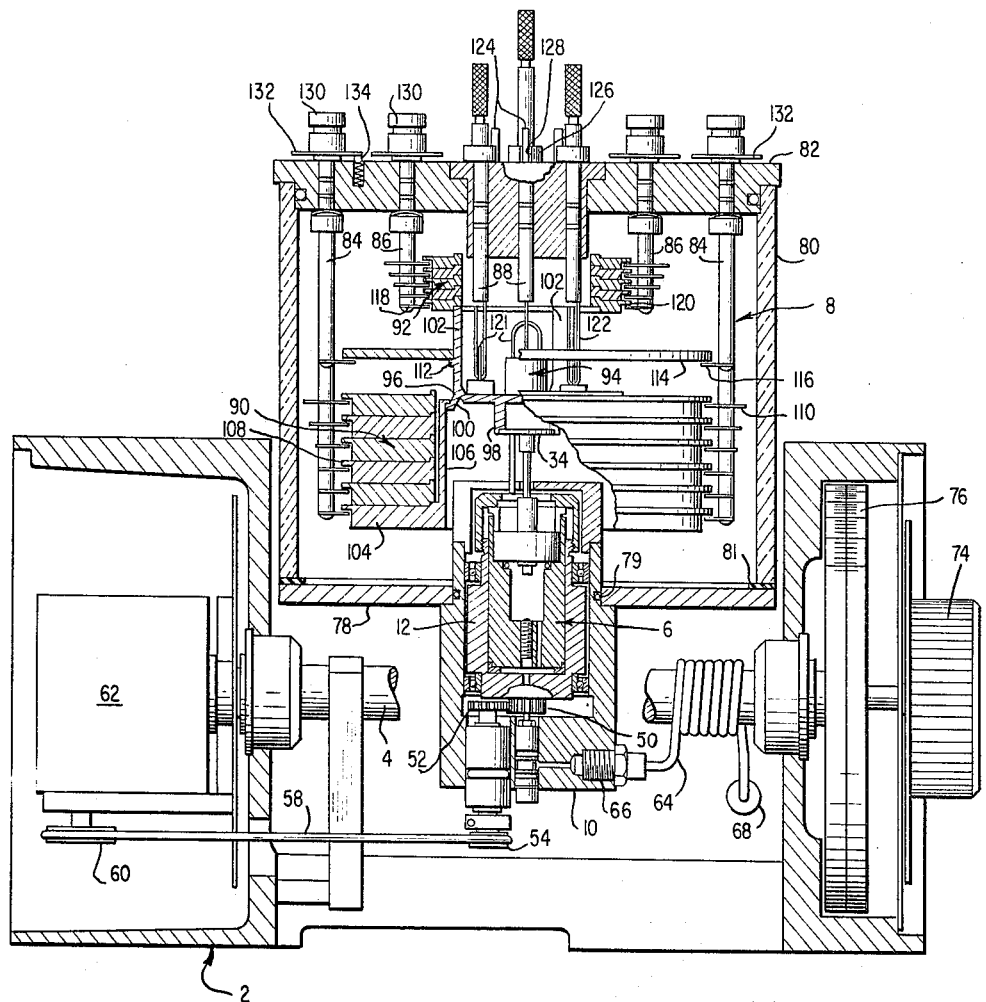
FIG. 1 is an elevational view, partly in section, of a device embodying the invention and showing the gauge in its vertical configuration for measuring pressures higher than those corresponding to the tare weight of the system.

Referring now more specifically to FIG. 1, the device is shown in the configuration for vertical measurement of pressure and comprises a base shown generally at 2 having a shaft 4 mounted therethrough. Cylinder assembly shown generally at 6 is mounted on shaft 4 and supports weight-changing assembly shown generally at 8.

Figure 3:
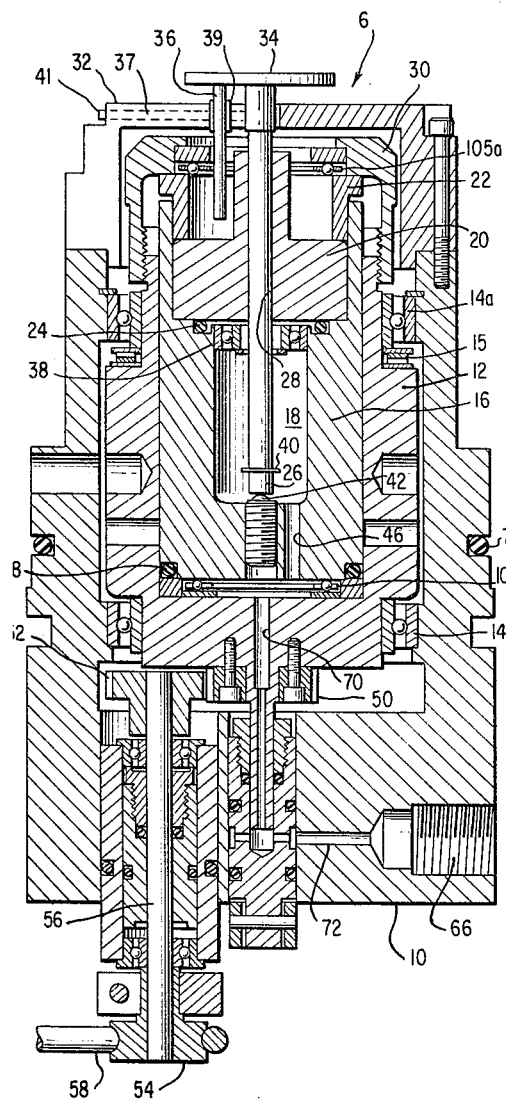
FIG. 3 is a further enlarged view of a piston-cylinder intended for use in the devices shown in FIGS. 1 and 2; and, FIG. 4 is a view similar to that of FIG. 3 of another piston-cylinder combination intended for use with the devices of FIGS. 1 and 2.

Cylinder mount 12 is provided with gear 50 concentrically mounted at the lower end thereof and in mesh with gear 52 which, in turn, is connected to pulley 54 through pulley shaft 56 (FIG. 3). The shaft is provided with suitable "O" ring seals and bearings to provide a rotational sealed mounting through housing 10. Sealing of this shaft is important when the gauge is provided with a vacuum reference pressure. This provision will be described in more detail below. Belt 58 connects pulley 54 to motor pulley 60. Drive means, such as electric motor 62, drives pulley 60 and is rigidly mounted to shaft 4 to be tiltable with cylinder assembly 6.

Flexible conduit 64 connects the piston-cylinder assembly to the source of pressure to be measured and is wound around shaft 4. The conduit is connected to port 66 in housing 10 at one end and at the other end to connection point 68 disposed through base 2 for connection to the source of pressure to be measured.

Knob 74 is connected to the end of shaft 4 and provides a means to rotate the shaft to provide tilting of cylinder assembly 6 and motor 62. Protractor 76 is provided to accurately measure the angle of tilt of cylinder assembly 6. Fine tilt adjustment means, such as a clutched worm-gear arrangement, may also be provided to furnish final fine adjustment of the angle of tilt.

Annular platform disc 78 is sealably mounted around housing 10 and serves to support weight-changing assembly 8 which comprises transparent jar 80, weight-changing deck 82 and weight-changing arm sets 84, 86 and 88. The arm sets 84, 86 and 88 selectively suspend sets of weights indicated generally at 90, 92 and 94 respectively as will be described in more detail below.

The sets of weights are mountable on weight support 34 through weight platform 96 which receives the weight support in a recess in the bottom surface thereof. This recess is formed by annular ring 98. The weight platform has a skirt portion 100 depending from the outer circumferential edge thereof and upstanding arms 102 equally spaced around the top peripheral surface thereof. Weight set 90 is connectible to weight platform 96 through annular support weight 104, which has upwardly extending cylindrical connector 106 coaxially disposed at the center thereof and engageable with the lower portion of skirt 100 as shown. The remainder of weights 90 are sleeved over cylindrical connector 106 and are selectively releasable to ride on support weight 104. Each of weights 90 is provided with a flange portion 108 for purposes to be described below.

Each of weight-changing arms 84 is provided with disc sectors 110 coaxially mounted at suitable intervals thereon. The discs are provided in equal number to the weights 90 and are disposed on arm 84 so that they are engageable with the under surface of flanges 108 when the arms are suitably rotated. The disc sectors are formed so that the lowermost sector describes a minimum sector of a circle, and, progressing upwardly, gradually increasing sectors of a circle until the uppermost sector describes the maximum sector of a circle which can be disengaged by rotation from contact with flange 108. Weights 90 are selected with weight support 34 in the uppermost position of travel to allow rotation of sectors 110 beneath flange 108 without contact therewith. This uppermost position of the apparatus is achieved by supply of an over-pressure to the cylinder assembly during the weight selection process. With the apparatus in this configuration, weight-changing arms 84, as a set, are rotated to place any desired number of sectors 110 beneath flanges 108. With arms 84 properly rotated, the over-pressure is released and the pressure to be measured is substituted allowing weight support 34 to be lowered. In this condition, weight platform 96 and support weight 104 follow the downward movement of weight support 34 leaving weights 90, under the flange of which sectors 110 remain, suspended from arms 84 thereby allowing selection of a desired number of weights 90 for incorporation in the system.

Upstanding arms 102 are provided with projections 112 which, in turn, support an additional annular weight 114 as shown. Projections 116 are also provided on arms 84 to operate, in a manner similar to that described for sectors 110, to selectively remove weight 114 from the system. Annular weights 92 are disposed in a position engageable with the upper ends of arms 102 and are provided with weight-changing arms 86 having disc sectors 118. The sectors are rotationally disposable under flanges 120 of weights 92 in a manner similar to that described above for weights 90.

Weights 94 are disposed on the upper surface of weight platform 96 and are provided with U-shaped handles 121 which are engageable with hooks 122 depending from weight-changing arms 88. Weight-changing arms 88 are slidably disposed through weight-changing deck 82 and weights 94 may be removed from the system by suitable upward withdrawal of arms 88. Means are provided for retention of arms 88 in the upward position and consist, in this embodiment, of pins 124 disposed through slot 128 in shoulder 126 associated with each of arms 88. Upward disposition of arm 88 until shoulder 126 clears the top of pin 124 followed by rotation of arm 88 to bring slot 128 out of alignment with pin 124 followed by release of arms 88 provides for upward retention of the arm and associated weight. "O" rings or other suitable sealing means are provided around each set of weight-changing arms 84, 86 and 88 to provide a pressure-tight seal for jar 80. Arms 84 and 86 may be provided with knobs 130 and annular discs 132 as shown. Discs 132 may be notched around the outer peripheral edge to co-operate with spring-loaded ball 134 in a ratchet-like relationship to provide proper alignment and identification of the rotated position of arms 84 and 86.

In operation, the apparatus is put in an over-pressure condition and the weights corresponding to a desired pressure are selected as described above. The pressure to be measured is then connected to the gauge and the weights selectively engaged are retained out of contact with the support when it descends to a balanced position.

This apparatus is utilized when it is desired to provide a vacuum reference pressure for the gauge. This is necessary when it is desired to calibrate gauges reading absolute pressure as has been described above. When this condition is desired, the jar is connected to a source of vacuum (not shown) and the ambient pressure in the jar is brought to zero. "O" ring 79 is provided between platform disc 78 and housing 10 to effect a pressure seal therebetween. Resilient annular seal 81 provides a seal between jar 80 and platform disc 78.

As was stated above, pressures corresponding to weights greater than or equal to the weight of the piston and connected structure are measurable with the piston and cylinder of the gauge in a vertical position. Pressures less than this weight cannot be measured with the gauge in this condition since that weight cannot be eliminated.

By tilting the piston toward a horizontal position, however, the weight component of the piston, acting against the fluid pressure, may be reduced to values less than the total weight thereof since the component of the piston weight acting axially of the cylinder varies as a function of the angle of tilt. The relationship can be described mathematically by the formula:

$$Wa = Wp \sin \alpha$$

where $Wa$ is the axially acting weight of the piston, $Wp$ is the total weight of the piston and $\alpha$ is the angle of the centerline of the cylinder with the horizontal. The axially acting weight of the piston may therefore be varied between full piston weight and zero by tilting the piston between the angles of 90° and 0°.

Figure 2:
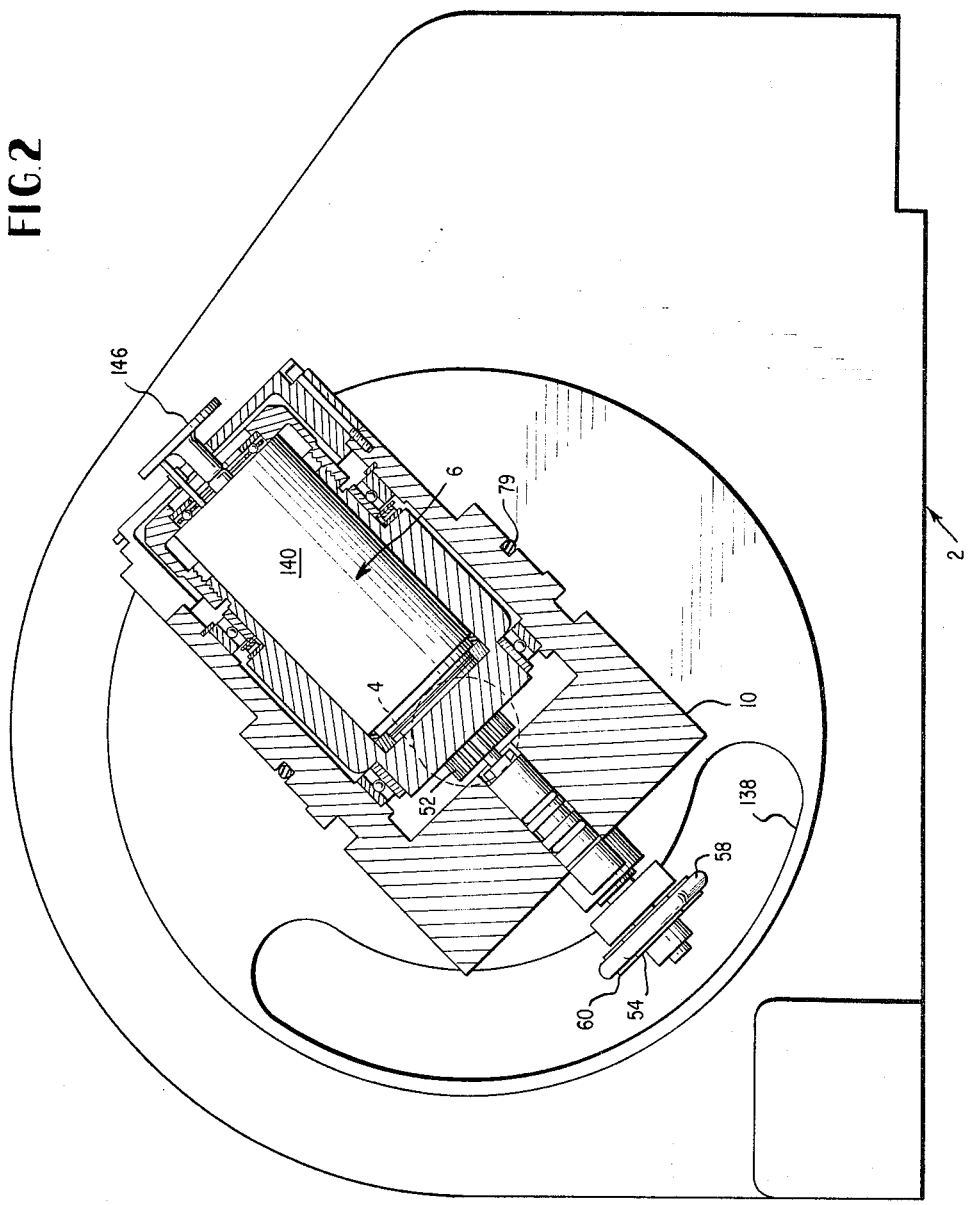
FIG. 2 is an enlarged side view of a device siimlar to that of FIG. 1 showing the invention in a tilted configuration for measuring pressures corresponding to weights lower than the weight of the piston of the gauge.

Referring now to FIG. 2 of the drawing, the device of FIG. 1 is shown in a tilted configuration.

As was also described above, shaft 4 is rotatable in base 2. Cylinder assembly 6 and motor 62 (FIG. 1) rotate therewith from a vertical position to a horizontal position and may be disposed at any intermediate angle therebetween. Slot 138 is disposed through the housing to provide a passage for belt 58 therethrough regardless of the angular relation of the respective components of the system.

Various piston-cylinder combinations may be furnished for the gauge to provide optimum performance in different pressure regimes. The pressure value measured is, of course, a function of the weight of the piston and the area of the piston presented to the pressure. The relationship is described by the formula:

$$P = F/A$$

where P is pressure, F is force or weight on the piston, and A is area. Obviously, by maintaining the same force or set of weights, and decreasing the area of the piston, higher pressure values may be measured. Decreasing the area of the piston, however, decreases the sensitivity of the gauge since the same weight represents a larger incremental increase in pressure with the smaller piston area than it does with the larger. This embodiment of the invention incorporates two piston-cylinder combinations shown in FIGS. 3 and 4, which represent high and low pressure units respectively. These piston-cylinder combinations are, as a unit, interchangeable in the gauge. One may be changed for the other merely by removing cap 30, changing of the unit and replacing of the cap. It should also be obvious that the unit of FIG. 4 would be more appropriate for use with the gauge for pressure in the regime requiring tilting of the gauge since this is the lower extreme of measured pressures and the sensitivity afforded by the larger piston would be advantageous.

Referring now to FIG. 3, cylinder assembly 6 comprises an outer cylindrical housing 10 which is rigidly mounted by suitable means to shaft 4 (FIG. 1). Housing 10 contains cylinder mount 12 rotatably mounted on bearings 14a and 14b. Cylinder 16 is fixedly mounted in cylinder mount 12 and comprises chamber 18, upper cylinder head 20, and cylinder head retainer 22. O-ring seal 24 is disposed between the cylinder head and cylinder to provide suitable sealing for chamber 18. Piston 26 is slidably fitted in the bore 28 disposed through cylinder head 20. Cylinder 16 is retained in cylinder mount 12 by cap 30 threaded on the cylinder mount. Housing cap 32 is fixedly attached to the top of housing 10. Piston 26 is disposed through a bore in housing cap 32 and weight support 34 is attached to the upper end thereof. Pin 36 depends from weight support 34 through slot suitably provided in housing cap 32 and is guided by rollers 39 mounted on pins 41. This serves to rotationally fix weight support 34 and piston 26 with respect to housing 10 without restraining axial movement of the assembly. Bearing 38 is disposed in the upper end of chamber 18 and serves to receive shoulder 40 on piston 26 to provide a rotatable upper limit for the travel of the piston. Bearing 42 disposed in housing 44 serves to provide a friction-free lower limit for movement of piston 26. Bore 46 provides a passageway for the pressurized fluid to be measured into chamber 18. O-ring 48 provides a pressure seal between cylinder 16 and cylinder mount 12.

15 is a spring loading washer which takes up tolerance in the unit. The drive train as described above, provides rotation of cylinder mount 12 and cylinder 16 with respect to housing 10 and piston 26 to provide a minimum sliding friction between the piston and cylinder.

Port 66 is communicative with bore 70 through the base of cylinder mount 12 and through bore 72 through the base of housing 10.

Figure 4:
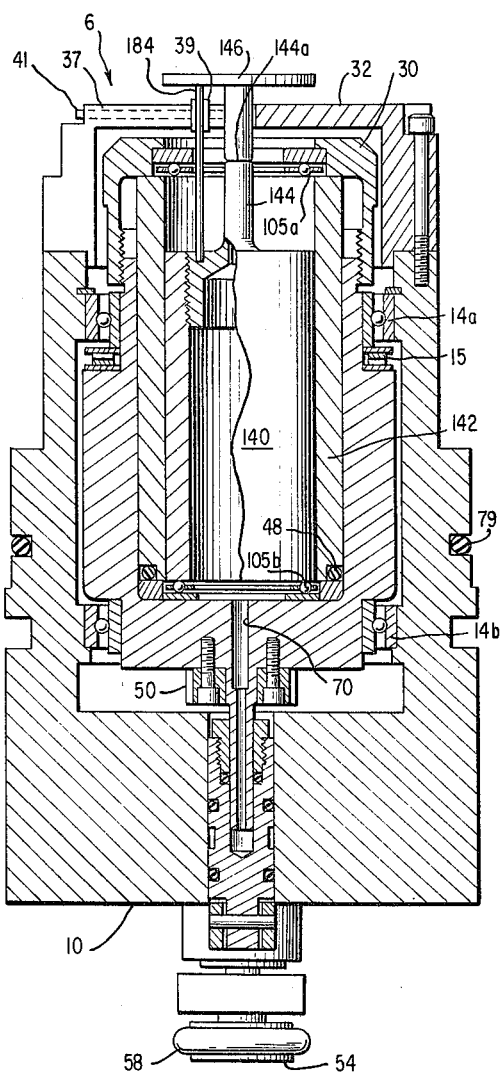

In FIG. 4, the low pressure piston-cylinder combination is shown with alternate piston 140 and cylinder assembly 142 disposed in cylinder assembly 6. Piston 140 is provided with stem 144 which projects through open end housing cap 32 as shown. Weight support 146 is a part of stem 144 and is provided with pin 184 depending from the bottom surface thereof and extending through a bore in housing cap 32 to the top surface of piston 140 to rotationally fix the piston and housing 10 in a manner similar to that described for the embodiment. Index line 144a on stem 144 is visible from the exterior for indicating the center position of the piston.

Bearings 105a and 105b are provided at the top and bottom ends of cylinder 142 to furnish rotational stops for piston 140 in its extreme positions of travel.

Although the device is specifically described powered by an electric motor, the driving force could obviously be derived from any suitable source such, for example, as the air driven pneumatic motor or the like. The motive source could also be mounted in a fixed position with a flexible drive shaft or the like connecting it to the drive gearing at the piston-cylinder structure rather than the pivotal mounting shown in the example.

The materials used in construction of the device are, in general, largely a matter of choice. In the fabrication of the piston and cylinder of the gauge, however, it has been found that use of a tungsten carbide alloy has eliminated many of the problems which have been encountered in prior dead-weight gauges. Because of the extremely close fit required between the piston and cylinder to minimize pressure leakage therebetween as well as the high wear resistance necessary due to the continuous rotation between the parts, it is preferable that tungsten carbide be utilized for this purpose. Specifically, a sintered tungsten carbide alloy composed of 94% tungsten carbide and 6% cobalt has been effective. This alloy provides a material in which the clearance between parts does not deteriorate due to minute rusting or ejection of oil used in quenching as has been suspected with other materials such, for example, as stainless steels.

These and other variations in the basic concept of the invention may obviously be incorporated without avoiding the true scope thereof. What has been shown is merely exemplary to demonstrate to those skilled in the art an embodiment of the invention and the invention may be practiced otherwise than as specifically taught within the scope of the appended claims.

What is claimed as new and desired to be protected by Letters Patent of the United States is:

1. A deadweight gauge comprising,
a base,
a piston and cylinder supported on said base, said cylinder closed at one end,
support means on one of said cylinder and piston for supporting a plurality of weights,
means providing for relative rotation of said cylinder and piston,
means admitting pressure fluid to be measured to the closed end of said cylinder,
a container defining a pressure sealed chamber disposed about said piston and cylinder,
a plurality of weights within the container,
and weight support means controlled from the exterior of the container selectively supporting said weights on the container or on said support means.

2. A deadweight gauge comprising,
a base,
a piston and cylinder supported on said base, said cylinder closed at one end,
support means on one of said cylinder and piston for supporting a plurality of weights,
means providing for relative rotation of said cylinder and piston,
means admitting pressure fluid to be measured to the closed end of said cylinder,
a container defining a pressure sealed chamber disposed about said piston and cylinder,
a plurality of weights within the container,
and a plurality of arms extending through the wall of said container, said arms having means selectively engaging or disengaging a plurality of said weights controlled by the rotative position of said arms, said weights when not engaged by the arms supported on said support means.

3. A deadweight gauge comprising,
a base,
a piston and cylinder supported on said base, said cylinder closed at one end,
support means on one of said cylinder and piston for supporting a plurality of weights,
means providing for relative rotation of said cylinder and piston,
means admitting pressure fluid to be measured to the closed end of said cylinder,
a container defining a pressure sealed chamber disposed about said piston and cylinder,
a plurality of weights within the container,
a plurality of arms extending through the wall of said container,
and a plurality of coaxial disc sectors on each arm for engaging a plurality of said weights, said sectors on each arm beginning at a common plane and extending through different arcs of a circle and selectively engaging or disengaging a plurality of said weights controlled by the rotative position of the arms, said weights when not engaged by said sectors supported on the support means.

4. A deadweight gauge having the capability of measuring a wide range of pressure comprising;
(1) a base;
(2) a horizontal shaft rotatably mounted on said base;
(3) a housing connected to said shaft, said housing having a cylindrical bore therein disposed perpendicular to the axis of said shaft;
(4) a cylinder block rotatably mounted in said bore, said block having a cylindrical bore in one end thereof and a pressure supply bore of reduced diameter in the other end thereof;
(5) means providing continuous rotational displacement between said block and said housing;
(6) a piston-cylinder assembly removably disposed in said cylindrical bore, said assembly comprising a tubular cylinder having an open end thereto, a pressure inlet through the closed end of said cylinder communicative with said pressure supply bore, a tubular cylinder liner sleeved in said cylinder, a piston slidably mounted in said liner, said piston having a portion thereof extending beyond said housing, means to fixedly connect said cylinder and said liner to said block, and means to restrain said piston from rotation with respect to said housing;
(7) a dome-like weight support adapted to connect to the extending portion of said piston for supporting a plurality of weights of known mass;
(8) a container defining a pressure sealed chamber removably disposed around said housing and formed to enclose one end thereof including said support;
(9) a plurality of arms depending through said container, said arms being selectively engageable with weights disposed on said support to retain desired ones thereof suspended above said support;
(10) means including a source of vacuum to evacuate said container to provide reference pressures lower than atmospheric pressure for said gauge; and
(11) means affording connection to said cylinder beneath said piston of a source of pressure to be measured;
whereby suitable arrangement of weights on said support with said housing in a vertical position provides measurement of pressures corresponding to weights at least equal to the weight of said piston and pressure corresponding to weights less than the weight of said piston may be measured by removing said support and tilting said housing to angles between a vertical and horizontal position.

5. In a universal deadweight tester having a rotationally stationary piston and a pressure sealed housing defining a chamber around said piston for providing controlled ambient conditions therefor, a remote piston weight changing apparatus comprising:

(1) a stem coaxially mounted on said piston to project into said housing;
(2) a weight support mounted on said stem;
(3) a plurality of weights mountable on said support, a first portion of said weights having an annular disclike configuration and being disposed in stacked relationship to one another on said support, a second portion of said weights being disposed centrally of said first portion weights and having connecting means associated with the top surfaces thereof;
(4) a plurality of arms depending through said housing into said chamber, a first portion of said arms being rotatably mounted in circumferentially spaced relationship adjacent to the periphery of said first portion weights, said first portion arms further having a plurality of axially spaced projections extending therefrom in circumferentially staggered relationship to one another, the projections of corresponding axial disposition on said first portion arms being insertable under the periphery of a weight of said first portion weights when said piston is disposed at its uppermost limit of travel by rotation of said first portion arms, a second portion of said arms being slidably and rotatably disposed through said housing to depend into said chamber and having connection means depending therefrom, the connection means of said second portion arms being engageable with said connection means of said second portion weights by upward axial displacement of said second portion arms, and means associated with said second portion arms to provide selective retention thereof in the upward position;

whereby suitable rotation of said first portion arms with said piston at its upper limit of travel to insert said projections under the periphery of desired ones of said first portion weights and upward axial displacement of said second portion arms to engage and retain desired ones of said second portion weights supports selected weights above said support when the pressure to be measured is connected to said gauge.

References Cited by the Examiner

UNITED STATES PATENTS 3,133,435   5/1964   Lewis _____ 73—4

OTHER REFERENCES

Hutton: "A Tilting Air-Lubricated Piston Gage for Pressures Below One-Half Inch of Mercury." In Journal of Research of the National Bureau of Standards, vol. 63C, No. 1 (pp. 47–49 relied on), July–September 1959.

LOUIS R. PRINCE, *Primary Examiner.*

D. O. WOODIEL, *Assistant Examiner.*